June 8, 1965 S. B. WHITE 3,187,730
TWO CYCLE INTERNAL COMBUSTION ENGINE
Filed Aug. 29, 1962 4 Sheets-Sheet 1

INVENTOR.
STANLEY B. WHITE
BY
ATTORNEYS

June 8, 1965 S. B. WHITE 3,187,730
TWO CYCLE INTERNAL COMBUSTION ENGINE
Filed Aug. 29, 1962 4 Sheets-Sheet 2

INVENTOR.
STANLEY B. WHITE
BY
ATTORNEYS

June 8, 1965   S. B. WHITE   3,187,730
TWO CYCLE INTERNAL COMBUSTION ENGINE
Filed Aug. 29, 1962   4 Sheets-Sheet 3

INVENTOR.
STANLEY B. WHITE
BY
ATTORNEYS

June 8, 1965  S. B. WHITE  3,187,730
TWO CYCLE INTERNAL COMBUSTION ENGINE
Filed Aug. 29, 1962  4 Sheets-Sheet 4

INVENTOR.
STANLEY B. WHITE
BY
ATTORNEYS

United States Patent Office 3,187,730
Patented June 8, 1965

3,187,730
TWO CYCLE INTERNAL COMBUSTION ENGINE
Stanley B. White, 615 Monteray Ave., Dayton, Ohio
Filed Aug. 29, 1962, Ser. No. 220,951
5 Claims. (Cl. 123—71)
(Granted under Title 35, U.S. Code (1952), sec. 266)

The invention described herein may be manufactured and used by or for the United States Government for governmental purposes without payment to me of any royalty thereon.

The present invention relates to an internal combustion engine and more particularly to a tandem piston, uniflow, two stroke cycle, expanding chamber device presenting numerous advantages over the devices of this nature in present use.

Difficulties arising in the use of two cycle engines now in use for boats, lawn mowers and like devices may be outlined as follows:

In the usual two stroke engine the exhaust ports and the cylinder fuel air admission ports are open for only 120° of crank shaft travel, necessitating large passages. In the design of this invention, a large concentric valve, or multiple valve system provides for the uniform admission and flow of the fuel air mixture into the combustion chamber without turbulence. Complicated extraneous systems for scavenging and lubrication become unnecessary in the device of this invention. The valves of the invention may be operated by other than mechanical means; such as, for example, gas.

The conventional engine requires that one quart of number thirty lubricating oil be mixed with every four or five gallons of fuel for lubricating purposes which increases the operating costs of the engine. This kind of operation requires a hot spark plug so that the plug will not be fouled by the oil fuel mixture at low speeds. A low compression ratio is used in this type of engine causing it to be very inefficient since a high compression ratio would overheat the spark plug causing it to break down. A satisfactory spark plug for this type of conventional engine with high compression has not yet been developed.

It is impossible in current two cycle engines to get a large fuel air mixture in the combustion chamber because of the poor scavenging provided by first drawing in and compressing the fuel air mixture in the crankcase. Complete or efficient scavenging of the combustion chamber is not possible and the fuel air mixture drawn in the crankcase cannot build up to a high enough pressure because of the large void space.

Engine smoking occurs. Speed is entirely controlled by advancing or retarding the ignition, which is extremely wasteful of fuel. In summarization the conventional two stroke cycle engine is unsatisfactory because of the low compression ratio, fuel oil mixture, poor scavenging, plug fouling at low speeds, plug breakdown at high speeds, smoking, and the necessity of retarding or advancing the ignition to control the speed.

The object of the invention is to provide a device which overcomes these disadvantages, and provides a device wherein the whole cycle is accomplished without interuption of the fuel flow. A sliding valve mounted on the piston rod midway two tandem pistons, and a sliding valve seat mounted in the piston cylinder provide for the actual expansion and contraction of the chambers in the piston cylinder. An engine is provided wherein the usual mixing of oil with the fuel for lubricating purposes is made unnecessary. The device lends itself to the method of splash lubrication of the power piston from the crank case now used only for four cycle engines. Because there is no side thrust on the parts of the cylinder assembly, and because of the induction system used for drawing the fuel from the carburetor, the fuel itself provides sufficient lubrication.

A body of fuel mixture is drawn into the combustion chamber on the down stroke or power stroke. That is, fresh fuel is drawn into the combustion chamber as with the combustion down stroke. Also, on the combustion down stroke a new supply of fuel is being drawn into the inlet chamber in readiness for compression on the upstroke. This arrangement makes possible a complete cycle in two strokes.

The routine operation of the device provides scavenging for the combustion chmaber so that cumbersome and complicated apparatus for this purpose is rendered unnecessary. The present device provides a tandem double piston engine which has an extremely light reciprocating mass.

Because of the design of the device, the shock to the piston rod is relieved. This is accomplished by (1) the bumper members, and (2) an uninterrupted and uniform flow of fuel and the uniform cushioned movement of the operating parts of the device.

The device of the present invention is economical to build and operate, and, since it delivers more horsepower per cubic inch of space and per pound of weight, it can replace the four stroke cycle engine now used almost universally by the automobile industry.

Provision is made for both lateral and axial injection of the fuel into the combustion chamber. In the axial arrangement, one of the tandem pistons operates also as a valve to admit the fuel mixture to the collecting or precombustion chamber. In the axial arrangement, the fuel mixture is admitted directly to this chamber.

These and other advantages, features and objects of the invention will become more apparent from the following description taken in connection with the illustrative embodiments in the accompanying drawings, wherein.

Figure 1:
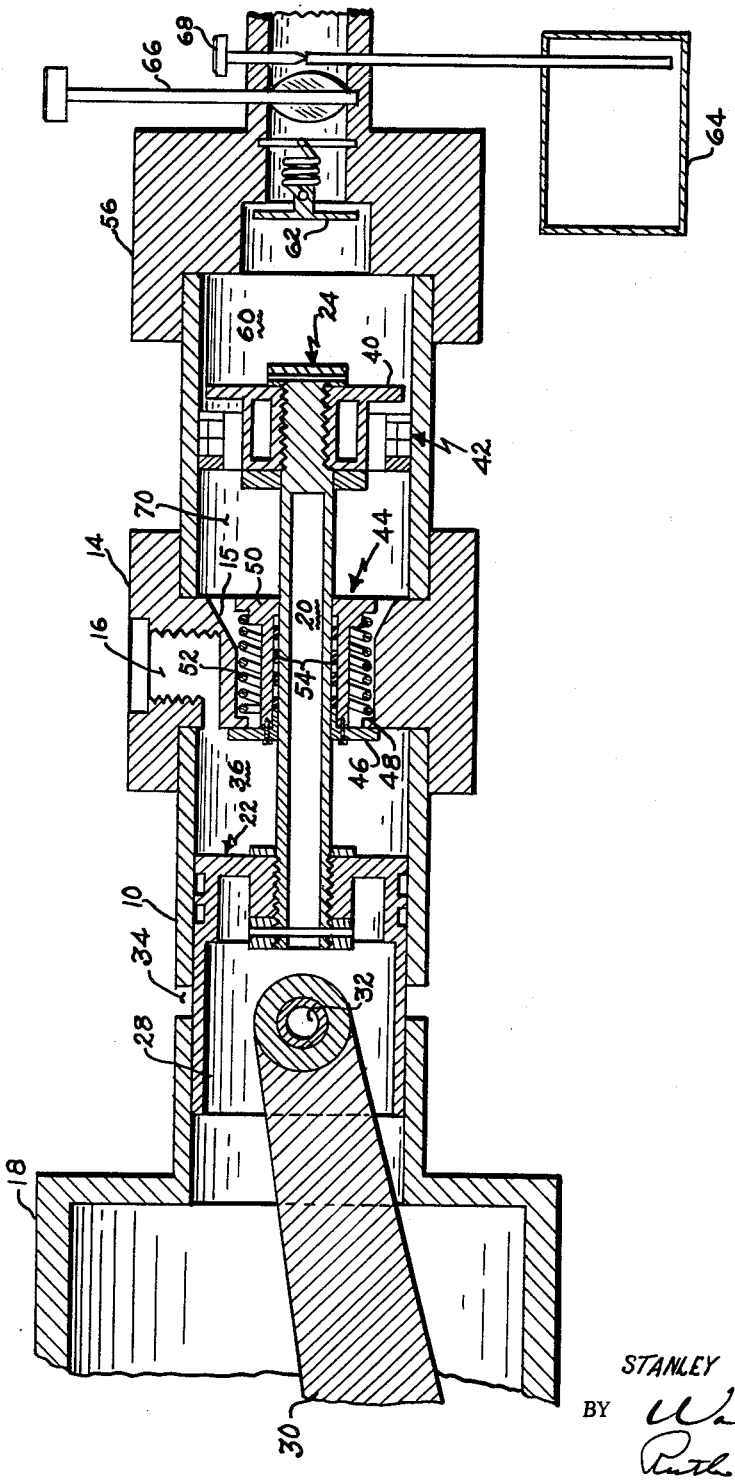
FIGURE 1 is a longitudinal cross-sectional view of one major design of the invention showing the fuel induction system in the axial position.

Referring in more detail to the drawings in FIGURE 1, a pair of casing members or piston cylinders 10 and 12 are joined in any suitable manner to an intermediate cylinder head member 14. The member 14 has recess accommodations for a spark plug at 16 and for a sliding valve unit later to be described. The casing member 10 is either secured to a crank case 18 or is formed as an integral part of it. A piston system includes the piston rod 20 made hollow for lightness and size and for possible lubrication; and tandem pistons 22 and 24. The power piston 22, lubricated from the crank case by a splash system, comprises a compression head member 26 secured to the piston rod 20 in any suitable manner such as the screw threaded engagement shown, and a sleeve 28, pivoted to the connecting rod 30 at 32. The cylinder 10 is provided with exhaust ports 34 which serve on the down stroke of the piston system, as will be later described, to clear the combustion chamber of combustion residue.

The piston valve system 24 serves as a compression piston and serves also the function of a valve. It is provided on its lower surface with a bumper washer 38. A head 40 is of smaller circumference than the piston cylinder 12 and forms a port for fluid passage. The piston ring unit 42 fits closely into the cylinder 12, has floating movement in the piston and functions as a valve seat. The ring unit may be comprised of several solid washer rings of Teflon, Oilite bronze, or other material having comparable lubricating properties.

A valve system 44 is slidably mounted on the piston rod 20, and is positioned in a bore provided therefor in the cylinder head 14. The conical formation of the cylinder head 14 at 15 augments the cushioning effect secured in the fluid flow throughout the whole system. An annular shoulder 48 on the cylinder head 14 provides a valve seat on one surface for seating the valve head 46, and on the opposite surface forms a spring recess and seat for the spring 52. By the seating of the opposite end of spring 52 on a shoulder provided on the valve body 50, the valve is normally biased to closed position. The valve body itself may fit the piston for sliding thereon, or may be provided with bearing rings 54 which alternate solid metal washers with spring washers.

A cylinder head 56 receives the piston cylinder 12 and together with the valve piston 24, defines the chamber 60 into which the fuel mixture is initially drawn through the spring biased valve 62 from the fuel source 64. The elements of the carburetor, the throttle 66 and the device 68 for mixture adjusting may be of any desired form. It will be noted that the intake valve 62 is arranged coaxially with the piston and piston cylinder, and that the mixture is drawn into the chamber 60 on the down stroke of the piston, as distinguished from a modification shown in FIGURE 4 of the drawing, and to be described later, where the fuel mixture is drawn directly into the pre-combustion chamber and wherein the carburetor elements are located radially. Both of these devices are two stroke engines. Although the design of the device as shown in FIGURE 1 is a two stroke engine, it takes four strokes in starting before an explosion occurs. After the engine is running, it operates as a two stroke engine. The conventional two stroke engine takes three strokes before an explosion occurs.

To explain how the device of FIGURE 1 functions, it will be assumed that the engine is already operating in the normal manner. Starting on the downward or power stroke, the piston system comprising the rod 20 and the tandem piston heads 22 and 24 move to the left as seen in FIGURE 1. The piston valve head 40 moves against the ring unit 42 which operates as a floating valve seat and closes the passage between the chamber 60 and the pre-combustion chamber 70. The fuel mixture from the carburetor unit 66-68 is drawn past the intake valve 62 at the same time the fuel mixture already in chamber 70 is being compressed. The fuel mixture in the chamber 70 has previously been transfered from the chamber 60 to the chamber 70 through the ports left open by the valve head 40 on the piston upstroke. Before the tandem piston assembly reaches bottom dead center, the piston 22 uncovers the exhaust ports 34 and the expended exhaust gasses escape. After the escape of the exhaust gasses from the combustion chamber 36 has been effected, the bumper washer 38 on the tandem piston head 24 contacts the member 50, bumps the valve open against the bias of the spring 52, opening a passage from the chamber 70 into the combustion chamber 36. The fuel mixture, under the compressive action of the piston 24, rushes into the combustion chamber 36, pushing whatever of the exhaust gases are remaining, out of the ports 34.

On the upstroke the valve 46-48 closes and the fuel mixture in the combustion chamber is compressed by the piston 22, and at the same time, the fuel mixture previously drawn into the chamber 60 is being transferred through passages now open between head 40 and piston rings 42 to the pre-combustion chamber 70. When the tandem piston reaches the end of the upstroke, the spark plug (not shown) fires the mixture compressed in the combustion chamber and the engine is ready for another cycle.

Figure 2:
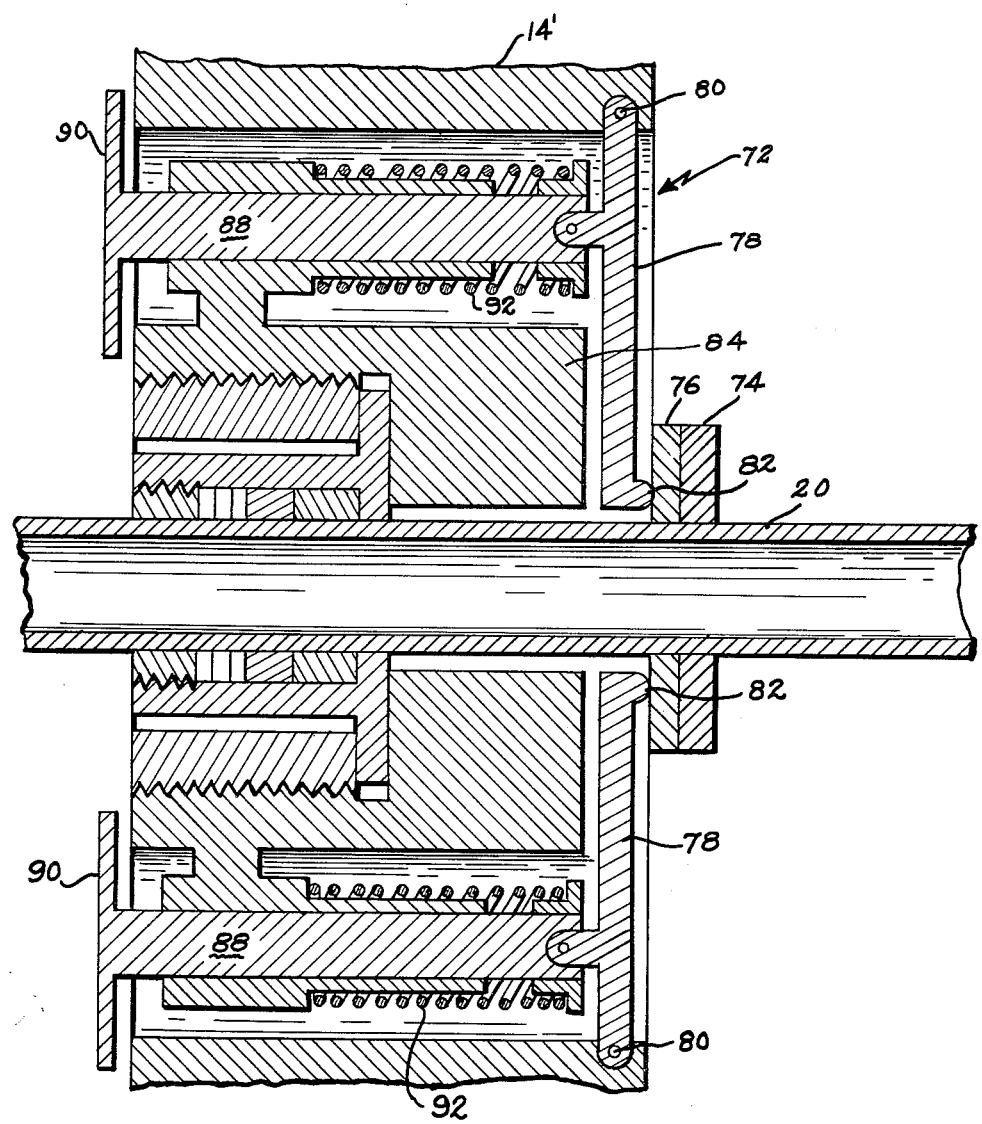
FIGURE 2 is a longitudinal cross-section of a modification of the sliding valve of FIGURE 1.
Figure 3:
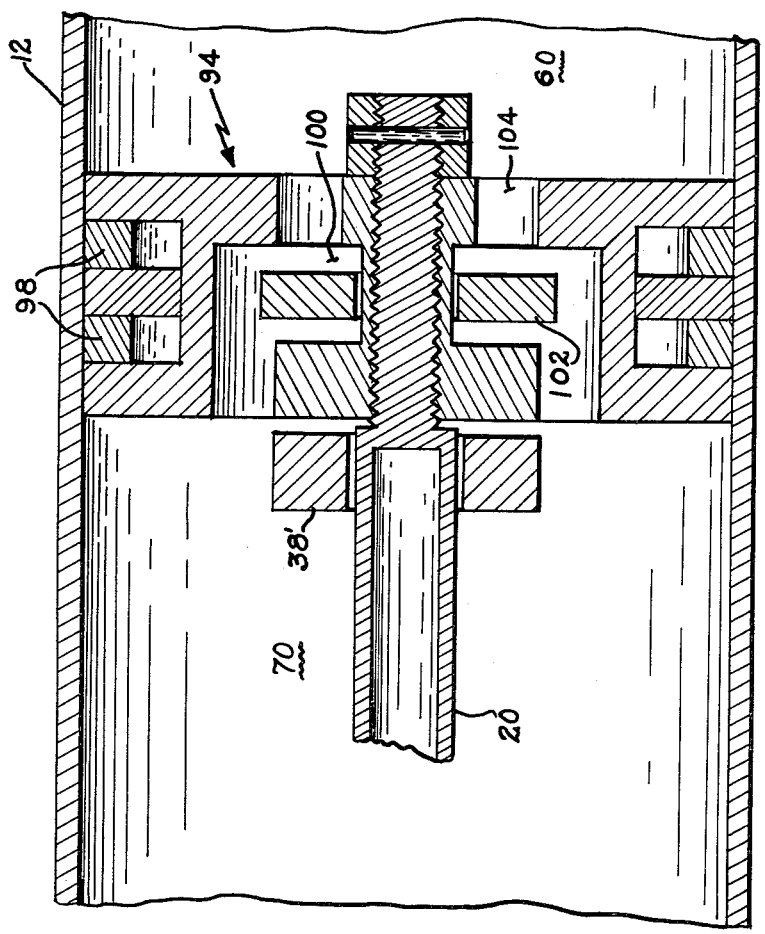
FIGURE 3 is a longitudinal cross-section modification of one of the tandem piston valve heads of FIGURE 1.

FIGURES 2 and 3 of the drawing show modifications of the sliding valve assembly and of the piston head valve. Either one or both at once, can be used to replace the sliding valve assembly 44 and the piston valve assembly 24, of the system shown in FIGURE 1, without modifying the uniflow operation of the whole design.

Referring now to FIGURE 2, the whole multiple valve assembly 72 replaces the valve assembly 44 of FIGURE 1. The bumper washer 38 of the compression piston 24 contacts a sliding compound washer element, made up of a Teflon or comparable washer 74 and a steel or comparable washer 76. Two or more radially positioned lever elements 78—78 are fulcrumed at 80—80 in a slightly modified cylinder head 14'. The movable washer 74-76 contacts the levers 78—78 at 82—82.

A plug 84 is slidably mounted on the piston rod 20 and is provided with a floating seal assembly indicated at 86 which may include Teflon bearing elements 88. The plug 84 is provided with a plurality of bores which accommodate valve stems 88—88. Each valve stem is pivoted to a lever 78 and has a head 90 capable of closing a port which extends entirely through the plug member 84, that is, referring to FIGURE 1, a chamber connecting chambers 60 and 70. Springs 92 are seated in the plug 84 and valve stem 88 to bias the valve head to closed position.

The device of this modification can be lubricated through the cylinder head from the outside, if this is found expedient or desirable.

In FIGURE 3 there is shown a modified piston valve head assembly 94 which can replace the compression piston assembly indicated at 24 in FIGURE 1. A piston element 96 sliding in the cylinder 12 is provided with circumferential recesses for accommodating Teflon, Oilite bronze or comparable bearing rings, and internal recesses which provide ports or passages between chambers 60 and 70. A counter bore 100 in the piston element 96 provides sufficient space for a floating ring valve head 102. When the piston moves down, i.e. to the left as shown in FIGURE 3, the pressure exerted on the valve head 102 closes the passage the port 104, thus closing communication between chambers 60 and 70. A floating washer 38' replaces the bumper washer 38 of FIGURE 1.

Figure 4:
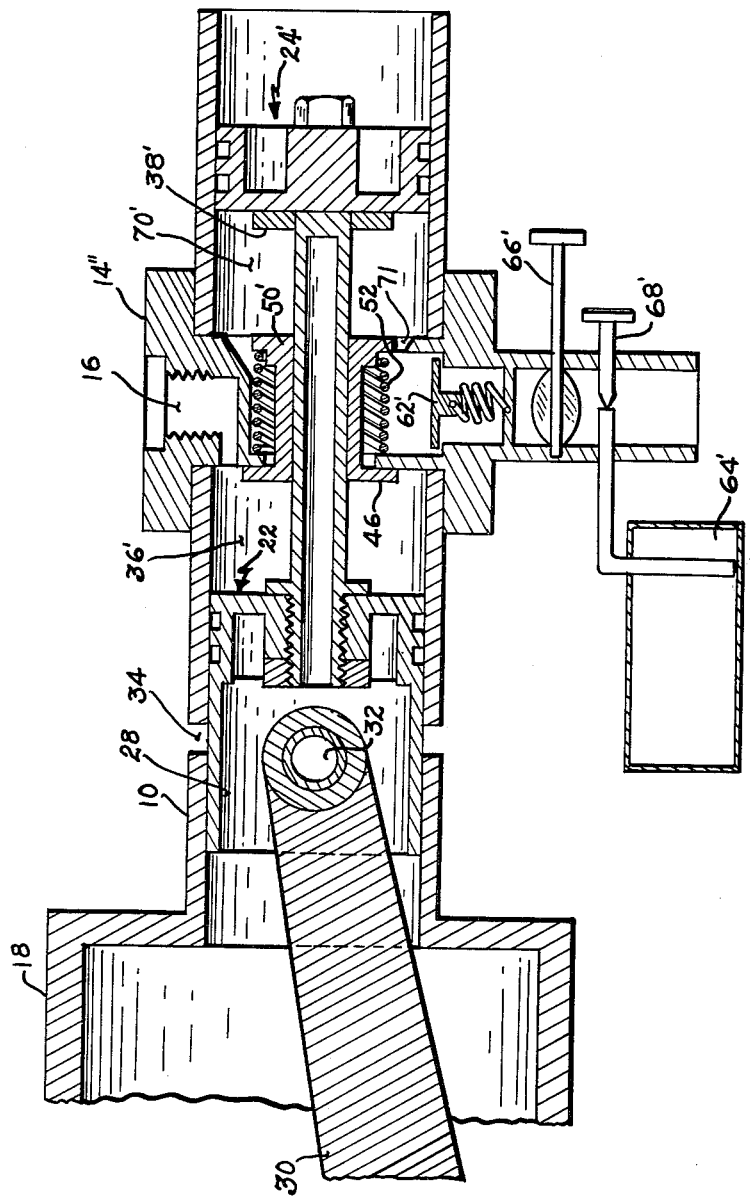
FIGURE 4 is a longitudinal cross-sectional view of a second major design wherein the fuel intake system is arranged laterally.

In FIGURE 4, there is shown a modified form of the device wherein the carburetor 66'-68' and spring biased intake valve 62' are placed radially and are part of a modified crank case 14''. The fuel mixture is admitted directly into the chamber 70' through a port 71. The piston 24' serves as a piston only, its function as a valve being made unnecessary by the direct fuel intake into the chamber 70'.

To explain the operation of the device of FIGURE 4, it will be assumed that the engine is already operating in the normal manner. Starting on the upstroke, the piston 24' draws the fuel mixture from the carburetor 66'-68' past the intake valve 62' into the chamber 70'. At the same time a fuel mixture in the combustion chamber 36' which has been previously transferred from chamber 70' through the port 71 past the opened valve 46 is being compressed.

At the end of the upstroke, the mixture in chamber 36' is ignited and the piston assembly starts on the next stroke or downward power stroke. At this time, the intake valve 62' closes, and the mixture in chamber 70' is compressed. When the piston 24' approaches the end of the downward or power stroke, the exhaust port 34 are uncovered and the spent exhaust gases escape. Next, the sliding valve 46 is opened by the compression piston 24' and the bumper element 38'. The fuel mixture in chamber 70' then rushes into combustion chamber 36', pushing out through the ports 34 whatever residue gases remain. The cycle is thus completed.

Although the invention has been described with reference to particular embodiments, it will be understood to those skilled in the art that the invention is capable of a variety of alternative embodiments within the spirit and scope of the appended claims.

What I claim is:

1. In a two stroke cycle internal combustion engine, a piston cylinder, a piston rod, a power piston and a compression-piston-one-way-valve unit having one way fuel inlet means incorporated therein, mounted on the distal ends of said piston rod forming a tandem piston system capable of reciprocating movement within said cylinder, a sliding one way valve, openable by contact with said piston and valve unit, mounted on said piston rod between said tandem pistons, a fuel inlet valve, said inlet valve, said sliding valve and said tandem piston system defining three chambers in said piston cylinder, a combustion chamber, an intermediate chamber and an intake chamber, said chambers being each capable of compression and expansion during the reciprocating cycle of said piston system, said sliding valve and said intake valve being opened on the down stroke of said tandem piston and closed on the upstroke thereof, said compression piston valve being closed on the down stroke and open on the upstroke of said tandem piston system.

2. In a two cycle internal combustion engine, a piston cylinder, a tandem piston system reciprocable in said cylinder, said tandem piston system comprising a piston rod, a power piston and a compression piston located on distal ends of said piston rod, fuel passage means incorporated in said compression piston, a head member having a valve seat located between the ends of said piston cylinder, a sliding valve head slidably mounted on said piston rod and forming with said valve seat a one way valve, an intake valve, said tandem piston system, said sliding one way valve and said intake valve defining three expansible and contractible coaxially located chambers, providing for continuous fuel flow through all three, an expansible combustion chamber, an expansible intermediate chamber and a fuel intake chamber, said intermediate chamber adapted, by means of and through said one way sliding valve to provide fresh fuel to said combustion chamber on the power stroke of said piston, ports in said piston cylinder, openable on the down stroke of said piston system to clear exhaust residue from said combustion chamber; wherein said fuel passage means includes a one way valve unit which comprises floating circumferential piston rings forming a valve seat, said last-named valve seat contacting said compression piston for closing the port through said valve unit on the downstroke of said compression piston, and whereby said port is opened on the upstroke of said compression piston for transfer of fuel from said inlet chamber to said intermediate chamber.

3. In a two cycle internal combustion engine, a piston cylinder, a tandem piston system reciprocable in said cylinder, said tandem piston system comprising a piston rod, a power piston and a compression piston located on distal ends of said piston rod, fuel passage means incorporated in said compression piston, a head member having a valve seat located between the ends of said piston cylinder, a sliding valve head slidably mounted on said piston rod and forming with said valve seat a one way valve, an intake valve, said tandem piston system, said sliding one way valve and said intake valve defining three expansible and contractible coaxially located chambers, providing for continuous fuel flow through all three, an expansible combustion chamber, an expansible intermediate chamber and a fuel intake chamber, said intermediate chamber adapted, by means of and through said one way sliding valve to provide fresh fuel to said combustion chamber on the power stroke of said piston, ports in said piston cylinder, openable on the down stroke of said piston system to clear exhaust residue from said combustion chamber; wherein said compression piston is provided with a bore and counter bore forming a port therethrough, a floating valve head mounted on said piston for limited movement thereon, said valve head adapted to move to close said port on the downstroke of said piston, and to open said port on the upstroke of said piston.

4. In a two cycle internal combustion engine, a piston cylinder, a tandem piston system reciprocable in said cylinder, said tandem piston system comprising a piston rod, a power piston and a compression piston located on distal ends of said piston rod, fuel passage means incorporated in said compression piston, a head member having a valve seat located between the ends of said piston cylinder, a sliding valve head slidably mounted on said piston rod and forming with said valve seat a one way valve, an intake valve, said tandem piston system, said sliding one way valve and said intake valve defining three expansible and contractible coaxially located chambers, providing for continuous fuel flow through all three, an expansible combustion chamber, an expansible intermediate chamber and a fuel intake chamber, said intermediate chamber adapted, by means of and through said one way sliding valve to provide fresh fuel to said combustion chamber on the power stroke of said piston, ports in said piston cylinder, openable on the down stroke of said piston system to clear exhaust residue from said combustion chamber; wherein said head member is provided with radially located and axially extending ports therethrough and comprises means for receiving the impact of said compression piston, levers radially located and fulcrumed in said head member at an end thereof, valve stems in said ports provided with valve heads capable of closing said ports, pivot connections between each of said valve stems and one of said levers at a point between its ends, a contact member on the distal end of each of said levers adapted to contact said impact receiving means, spring means for biasing each valve head to closed position, whereby each port is normally closed, and is opened only on the downstroke of said piston valve.

5. A two cycle internal combustion engine having three contiguous expansive and compressible chambers and continuous fuel flow, said engine comprising a piston cylinder, a one way fuel inlet valve located at one end of said piston cylinder, a tandem piston system adapted for reciprocation in said cylinder, said tandem piston system comprising a piston rod, a power piston and a compression piston located at distal ends of said piston rod, and a one way sliding valve positioned for sliding on said piston rod and located between said tandem pistons to form an expansive and compressible combustion chamber on one side of said sliding valve and an expansive and compressible intermediate chamber located on the other side of said sliding valve, a sliding piston ring and a one way valve on said compression piston, an expansive and compressible inlet chamber located between said compression piston and said inlet valve whereby fuel is transferred from said inlet chamber to said intermediate chamber on the return stroke of said tandem piston and whereby fuel is transferred from said intermediate chamber to said combustion chamber on the power stroke of said tandem piston.

References Cited by the Examiner

UNITED STATES PATENTS

| | | | |
|---|---|---|---|
| 560,920 | 5/96 | Parker | 123—71 |
| 950,162 | 2/10 | Stahl | 123—57 |
| 1,148,206 | 7/15 | Westinghouse | 123—57 |
| 2,551,478 | 5/51 | Wagers | 123—70 |

FOREIGN PATENTS 786,488    9/35    France.

FRED E. ENGELTHALER, Primary Examiner.